US006990199B2

(12) United States Patent
Parker et al.

(10) Patent No.: US 6,990,199 B2
(45) Date of Patent: Jan. 24, 2006

(54) APPARATUS AND METHOD FOR CIPHER PROCESSING SYSTEM USING MULTIPLE PORT MEMORY AND PARALLEL READ/WRITE OPERATIONS

(75) Inventors: James Darren Parker, Tempe, AZ (US); Satish Anand, Chandler, AZ (US)

(73) Assignee: Corrent Corporation, Tempe, AZ (US)

( * ) Notice: Subject to any disclaimer, the term of this patent is extended or adjusted under 35 U.S.C. 154(b) by 1037 days.

(21) Appl. No.: 09/978,742

(22) Filed: Oct. 16, 2001

(65) Prior Publication Data

US 2002/0186839 A1     Dec. 12, 2002

Related U.S. Application Data

(60) Provisional application No. 60/297,693, filed on Jun. 12, 2001.

(51) Int. Cl.
| | |
|---|---|
| *H04K 1/04* | (2006.01) |
| *H04K 1/06* | (2006.01) |
| *H04K 1/00* | (2006.01) |
| *H04L 9/00* | (2006.01) |

(52) U.S. Cl. .......................................... 380/37; 380/28
(58) Field of Classification Search ................... 380/37
See application file for complete search history.

(56) References Cited

U.S. PATENT DOCUMENTS 6,088,800 A     7/2000 Jones et al.

6,226,742 B1     5/2001 Jakubowski et al.

FOREIGN PATENT DOCUMENTS

EP             1 191 739 A2     3/2002

OTHER PUBLICATIONS

Kundarewich P. "A CPLD-based RC-4 Cracking System" 1999 IEEE Canadian Conference on Electrical and Computer Engineering, Edmonton, Alberta, Canada, May 9-12, 1999, pp. 397-402.

K. Kaukonen et al., "A Stream Cipher Encryption Algorithm "Arcfour"" Internet-Draft, Internet Engineering Task Force, Jul. 14, 1999, pp 1-14.

*Primary Examiner*—Gilberto Barrón, Jr.
*Assistant Examiner*—Benjamin E. Lanier
(74) *Attorney, Agent, or Firm*—Ingrassia Fisher & Lorenz PC (57) ABSTRACT

An encryption processing system implements an encryption algorithm using a memory system comprising a multiple-port memory by performing at least one set of parallel read and write operations to the memory. The algorithm is, for example, the conventional ARCFOUR (or RC4) algorithm, and the key and state array used in the ARCFOUR algorithm are stored in the multiple port memory. During execution of the ARCFOUR algorithm, a read from one port of the multiple port memory of a state array value is done while another port is used to write a new value to the state array. The use of such parallel read and write operations uses a comparator system that determines whether to use certain previously-read values from the state array or to read a new value from the state array when selecting the pseudorandom K byte to calculate the output data byte.

31 Claims, 5 Drawing Sheets

| Clock Cycle | rd_addr | Q output | t_reg | K | wr_addr | D input | Actions |
|---|---|---|---|---|---|---|---|
| 0 | x_cnt | | | | | | Read x. |
| 1 | y_fast | state[x] | | | | | Read y. Latch y_reg. Latch Sx_reg. |
| 2 | | state[y] | | | y_reg | Sx_reg | Write y. Latch Sy_reg. Latch t_reg. |
| 3 | t_reg | | t | | x_cnt | Sy_reg | Read t. Write x. |
| 4 | | state[t] | | state[t], state[x], or state[y] | | | Store cipher output byte in output data register 114. Increment x_cnt. |

FIG. 4

| Clock Cycle | rd_addr | Q output | t_reg | K | wr_addr | D input | Actions |
|---|---|---|---|---|---|---|---|
| 0 | x_cnt | | | | | | Read x. |
| 1 | | state[x] | | | | | Latch y_reg.<br>Latch Sx_reg. |
| 2 | y_reg | | | | | | Ready. |
| 3 | | state[y] | | | y_reg | Sx_reg | Write y.<br>Latch Sy_reg.<br>Latch t_reg. |
| 4 | t_reg | | t | | x_cnt | Sy_reg | Read t.<br>Write x. |
| 5 | | state[t] | | state[t],<br>state[x], or<br>state[y] | | | Store cipher output byte in output data register 114.<br>Increment x_cnt. |

APPARATUS AND METHOD FOR CIPHER PROCESSING SYSTEM USING MULTIPLE PORT MEMORY AND PARALLEL READ/WRITE OPERATIONS

RELATED APPLICATION

This application is a non-provisional application claiming benefit under 35 U.S.C. sec. 119(e) of U.S. Provisional Application Ser. No. 60/297,693, filed Jun. 12, 2001 (titled APPARATUS AND METHOD FOR CIPHER PROCESSING SYSTEM USING MULTIPLE PORT MEMORY AND PARALLEL READ/WRITE OPERATIONS by Parker, et al.), which is incorporated by reference herein.

BACKGROUND OF THE INVENTION

The present invention relates in general to encryption processing systems and, more specifically, to an apparatus and method for encrypting and decrypting data using a multiple port memory and parallel read/write operations to two or more ports of the memory during encryption processing.

The RC4 algorithm developed by RSA Data Security, Inc., is one of the most popular encryption algorithms in the Internet web browser market. The ARCFOUR algorithm is another encryption algorithm that was developed to be fully compatible with the RC4 algorithm and is potentially useful with several security protocols, including, for example IPSec and TLS. The ARCFOUR algorithm can be used with a key having a variety of key lengths, and is often implemented with a 40-bit or 128-bit key. Prior to using the algorithm, a state array is initialized using the key.

The algorithm itself is a stream cipher and operates to encrypt or decrypt one byte of data at a time. After the state array is initialized, the input text is processed one byte at a time by an XOR logical operation (sometimes referred to herein as "XORed" or "XORing") of a so-called pseudo-random byte K, which is generated by an algorithm using the state array, with the byte of input text. The result of this XOR operation is one output data byte, which may be in either encrypted or decrypted form depending on the initial state of the input byte.

More specifically, the ARCFOUR algorithm requires storage of a 256-byte state array and also temporary storage of a key in, for example, a 256-byte key array. The length of the key must be an integer multiple of bytes with a maximum length of 256 bytes.

After a new key is loaded into the key array, the state array is initialized. First, the state array is written with values 0 to 255. Then, each location in the state array is modified by the following algorithm, with x and y each initially starting at 0:

$Sx=state[x]$ $Kx=key[(x\ mod\ key\_length)]$ $y=(y+Sx+Kx)mod256$ $Sy=state[y]$ $state[y]=Sx$ $state[x]=Sy$ $x=(x+1)mod256$ The ARCFOUR algorithm for cipher processing a single byte is shown in the following equations. For processing each input byte, three reads from the state array and two writes to the state array are performed.

$x=(x+1)mod256$ $Sx=state[x]$ $y=(y+Sx)mod256$ $Sy=state[y]$ $state[y]=Sx$ $state[x]=Sy$ $t=(Sx+Sy)mod256$ $K=state[t]$ output byte=(input byte)$XOR\ K$ The standard ARCFOUR algorithm, when implemented in a hardware processor, requires that three read and two write operations from a local memory, such as, for example, a random access memory (RAM) that is storing the state array, be done for each iteration of the algorithm. In prior hardware implementations, typically six processor clock cycles have been required to perform the required read, write, and XOR operations necessary to generate each output byte. However, it would be desirable to implement the algorithm in fewer clock cycles so that the throughput of an encryption processing system could be increased.

In addition, in prior hardware implementations, the writing of the key to and the initialization of the state array in the local memory has required a large number of clock cycles to perform. For example, prior processing systems typically require about 256 clock cycles to initialize the 256-byte state array required by the ARCFOUR algorithm. It would be desirable to write the key and initialize the state array in fewer clock cycles so that processor throughput could be increased.

Moreover, when a processor is used to handle different packets, the state of the array is often saved to external memory and restored again to its prior state to process later packets using the same state array (such as may be required for a single security session using the ARCFOUR algorithm). It would be desirable to be able to restore the previous state of the state array to the local memory using fewer clock cycles so that the throughput of the processor could be further increased.

Thus, there is a need for an improved encryption processing system that implements the ARCFOUR algorithm, is able to write a key and initialize a state array, and is able to restore a previous state of the state array, all in fewer clock cycles.

DETAILED DESCRIPTION OF THE DRAWINGS

The present invention generally provides an improved encryption processing system and method for performing encryption processing in fewer clock cycles. The encryption processing system and method of the present invention implement an encryption algorithm using a memory system comprising a multiple-port memory and by performing at least one set of parallel or substantially simultaneous read and write operations to the memory during execution of the algorithm.

In a specific embodiment of the present invention the algorithm is the conventional ARCFOUR algorithm, and the key and state array used in the ARCFOUR algorithm are stored in the multiple port memory. During execution of the ARCFOUR algorithm, a read from one port of the multiple port memory of a state array value is done while another port is used to write a new value to the state array. The use of such parallel read and write operations uses a comparator system according to the present invention so that the encrypted output data complies with the standard ARCFOUR algorithm in all cases. The comparator system determines, as described in more detail below, whether to use the values of Sx or Sy from the ARCFOUR algorithm described above or to read a new value from the state array for providing the pseudorandom K byte used in the final XOR operation to calculate the output data byte.

In one aspect of the present invention, the multiple port memory is configured to have a word size that is two or more bytes wide. The memory system according to the present invention uses multiplexing at the read and write ports of the memory to allow the reading and writing of multiple-byte words during initialization and saving of the state array to external memory while permitting a single byte read or write during execution of the ARCFOUR algorithm during normal operation.

Because the ARCFOUR algorithm operates on only one byte at a time, existing ARCFOUR implementations use a memory word size that is only one byte wide. By using a multiple-byte word size according to the present invention, initialization and restoring of prior state array values requires fewer clock cycles to complete. Also, by using parallel read and write operations and the comparator system, fewer clock cycles are required to process each input data byte.

In a second aspect of the present invention as will be discussed in greater detail below, the y and t index values from the ARCFOUR algorithm described above are used to perform read operations from the memory in the same clock cycle as these values are being computed. In other words, the y and t values are not latched prior to their use to read the state array. The use of the multiple port memory described above permits computing y and t and reading the state array in the same clock cycle.

Figure 1:
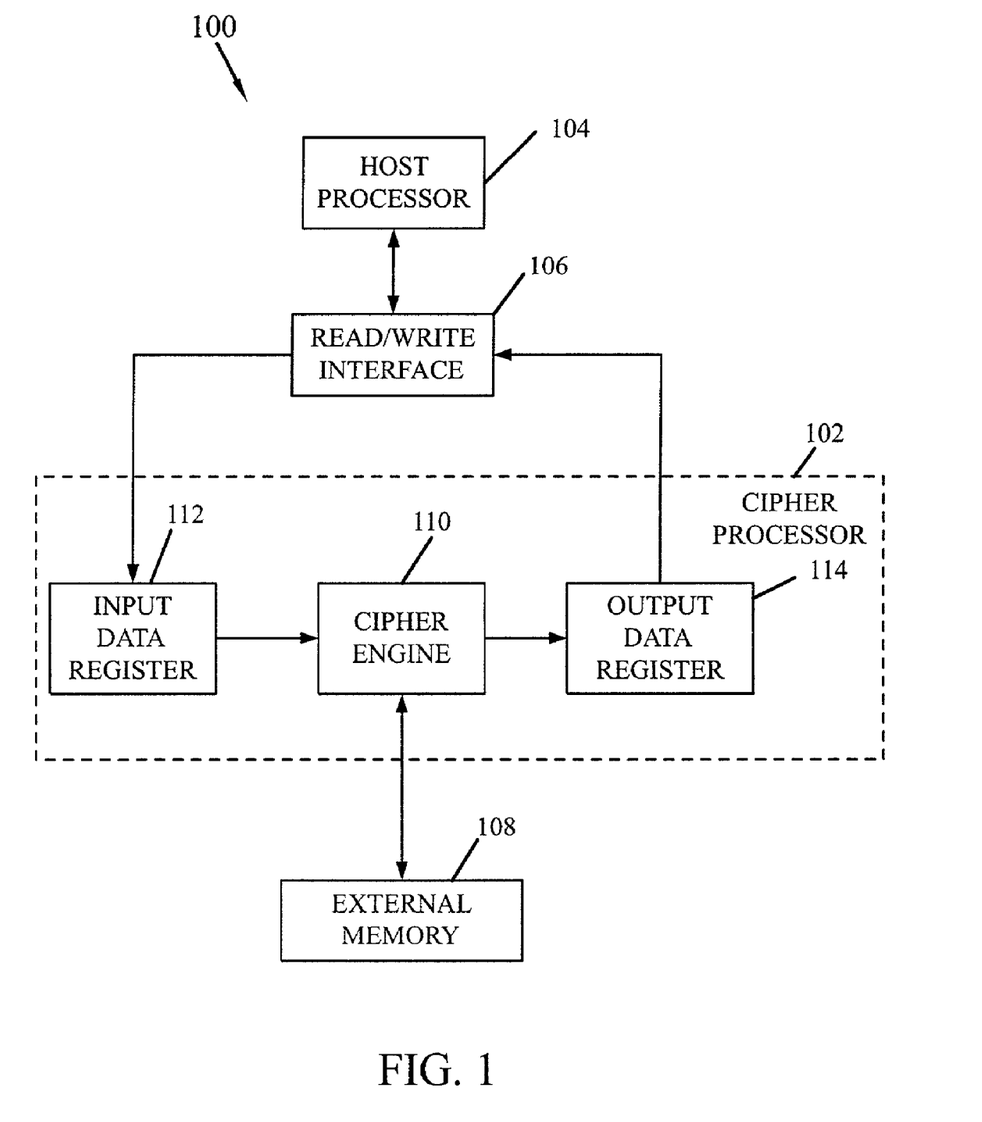
FIG. 1 is a block diagram of a system-level architecture of an encryption processing system according to the present invention.

A specific embodiment of the present invention is now described in more detail with reference to the figures. FIG. 1 is a block diagram of a system-level architecture of an encryption processing system 100 according to the present invention. System 100 comprises a cipher processor 102 coupled to a host processor 104 through a read/write interface 106. An external memory 108 is coupled to a cipher engine 110 in cipher processor 102. An input data register 112 accepts input data for encryption processing from host processor 104, and an output data register 114 provides output data to host processor 104.

Cipher engine 110 implements, for example, the ARCFOUR algorithm. However, one of skill in the art will recognize that other encryption algorithms may make use of the memory system and comparator system of the present invention. Cipher engine 110 and registers 112 and 114 are typically manufactured on a single integrated circuit using conventional processing. External memory 108 is, for example, double-data rate synchronous dynamic RAM (DDR-SDRAM) used to temporarily store state arrays for restoration back to cipher processor 102.

Figure 2:
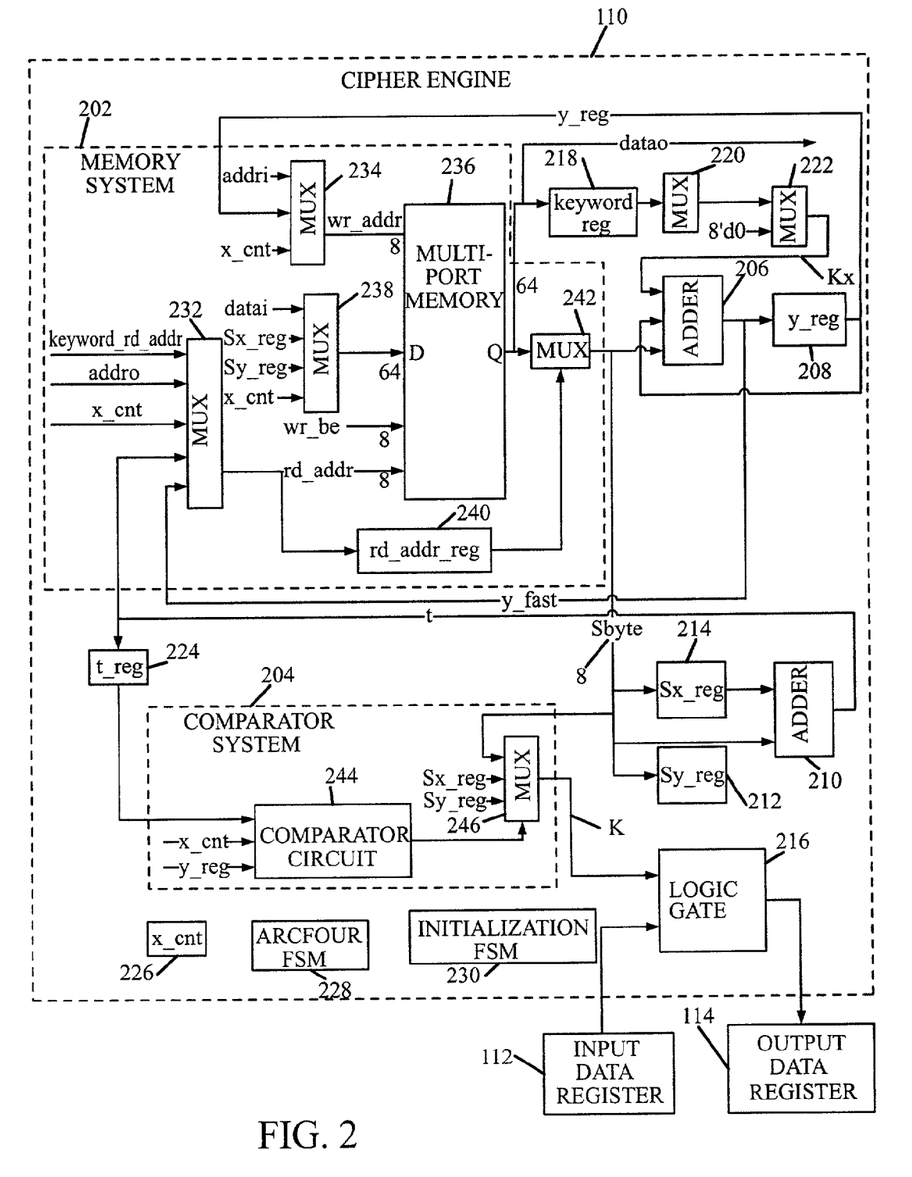
FIG. 2 is a detailed block diagram of a cipher engine according to the present invention in the encryption processing system of FIG. 1.

FIG. 2 is a detailed block diagram of cipher engine 110, which comprises a memory system 202 for storing a key and state array and a comparator system 204 for selecting the value of the K byte to use in encrypting or decrypting an input data byte. Comparator system 204 is coupled to a logic gate 216 that, for example, implements the XOR operation in the ARCFOUR algorithm. Logic gate 216 receives the K byte from comparator system 204 and the input data byte from input data register 112. The output byte is provided to output data register 114. Logic gate 216 could implement other logical operations for other encryption algorithms.

A register 226 stores an x_cnt value that corresponds to the current value of index x from the ARCFOUR algorithm. An ARCFOUR finite state machine (FSM) 228 controls the execution of the normal ARCFOUR algorithm, and an initialization FSM 230 controls the writing of the key to and initialization of the state array in memory system 202.

More specifically, memory system 202 comprises a multiple-port memory 236 that stores the key and state array values. Memory 236 is illustrated as having two ports D and Q. However, one of skill in the art will recognize that more than two ports may be used with the present invention in other embodiments. Memory 236 is, for example, 8 bytes wide and has a 64-bit input and output data interface. A multiplexer ("mux") 242 selects one byte from the 8 bytes read from memory 236 during a read operation. The selected state array byte is referenced in FIG. 2 as the Sbyte signal.

Memory system 202 further comprises a mux 232 for providing a read address rd_addr to memory 236, a mux 238 for providing input data to port D, and a mux 234 for providing a write address wr_addr to memory 236. Muxes 232, 234, and 238 are each controlled by ARCFOUR FSM 228. Signal rd_addr is latched in a register 240 as value rd_addr_reg. Mux 242 is controlled by the value of rd_addr_reg from register 240 using the lower three bits of rd_addr as stored in register 240.

When writing memory 236, eight write enable signals wr_be are used, each one corresponding to one byte lane of the write data bus. The wr_be signals are necessary since the ARCFOUR algorithm operates on only one byte at a time.

Mux 232 has several inputs. A first input is a read address keyword_rd_addr used only when reading values from the key stored in memory 236. A, for example, 64-bit word is read during each such read operation and stored in a register 218. Input keyword_rd_addr is used during initialization to read each key byte. Mux 220 selects the appropriate byte from the 64-bit word by using the lower three bits of rd_addr as stored in register 240, which byte corresponds to value Kx in the ARCFOUR algorithm described above. Mux 222 passes Kx to adder 206 only during initialization. Muxes 220 and 222 are controlled by both ARCFOUR FSM 228 and initialization FSM 230. Since the key byte is only used in the calculation of y during intialization, mux 222 is used to force the key byte value to zero during normal ARCFOUR operation. During initialization, register 218 and mux 220 are used to provide the desired key byte to be used in the y calculation, which is performed in an adder 206.

Separate read and write interfaces are provided in memory system 202 to permit host processor 104 to load or unload the state array or key in, for example, 32 clock cycles. Specifically, these interfaces are provided by a read address addro input to mux 232, a write address addri input to mux 234, and 64-bit data input bus datai and 64-bit data output bus datao. The use of an 8-byte wide memory reduces the number of cycles required to write keys and/or state to memory 236 by a factor of eight compared to prior byte-wide memory implementations. The 8-byte wide memory also reduces the number of clock cycles required to initialize the state array after a new key is written to memory 236.

During execution of the ARCFOUR initialization or cipher algorithms, mux 232 selects input x_cnt, t, or y_fast to provide rd_addr, depending on the state array value currently needed by the algorithm. Mux 238 selects input x_cnt during the first clock of the ARCFOUR algorithm and selects either Sx_reg or Sy_reg when performing byte swapping of values Sx and Sy (as described in the ARCFOUR algorithm) in the state array. Mux 234 selects input x_cnt as the write address when writing the value of Sy_reg to the state array and selects input y_reg as the write address when writing the value of Sx_reg to the state array.

Adder 206, for example an 8-bit adder, is coupled to a register 208 for storing a y_reg value that corresponds to the y index in the ARCFOUR algorithm. Adder 206 adds the current value of y from register 208 to Sx to calculate a new value of y during normal operation.

As mentioned above, register 218 stores a keyword reg value that is used only during initialization. Muxes 220 and 222 select the proper value of Kx to provide as an input to adder 206 during initialization of the state array. Specifically, mux 220 selects one of eight key bytes, and mux 222 allows the key byte to pass to adder 206. Otherwise, during normal operation, mux 222 provides an 8-bit zero output indicated by "8'd0" in FIG. 2.

According to one aspect of the present invention, the output of adder 206 provides a y_fast signal used to address memory 236 when reading the state array value state[y]. The y_fast signal is computed in the same clock cycle as the reading of state[y]. The value of y is latched in register 208 in the same clock cycle.

A register 214 stores the state array value state[x] as Sx_reg, and a register 212 stores the state array value state[y] as Sy_reg. An adder 210, for example an 8-bit adder, receives Sbyte and the value Sx_reg to calculate a new value of t, which is coupled directly to memory system 202 and latched in a register 224 as the value t_reg.

According to another aspect of the present invention, comparator system 204 comprises a comparator circuit 244 configured using conventional comparators to compare the value of t_reg to the current values of x_cnt and y_reg. Comparator circuit 244 controls a mux 246, which selects, as described in more detail below, the value of Sx_reg, Sy_reg, or the current value of signal Sbyte (currently being read from the state array) for use as pseudorandom byte K to XOR with the input data byte in logic gate 216.

Now describing the operation of cipher engine 110 in more detail, as was discussed above, a conventional ARCFOUR algorithm hardware implementation calls for two write operations to memory 236, described previously above as the following operations:

state[y]=Sx state[x]=Sy

The conventional ARCFOUR algorithm implementation next calls for a read operation from memory 236 to determine the value in the state array corresponding to value t, described previously above as the following operation:

K=state [t]

It should be noted that the value t used to access the state array could, in some cases, have the same value as x or y for the current iteration of the ARCFOUR algorithm. This is significant because in such cases the value in the state array that will be later read as K is written to the state array as one of the two write operations done just prior to the read operation used to determine K. Thus, the conventional approach to implementing the ARCFOUR algorithm is to complete the two write operations prior to performing the last read operation.

According to a method of the present invention, comparator system 204 is used to determine whether the value of t for the current algorithm iteration is equal to x or y and, in response to the comparison, to select to use the value of K either from memory 236 or from a register. More specifically, comparator circuit 244 compares t to x_cnt and y_reg. If t is not equal to either x_cnt or y_reg, then mux 246 selects the signal Sbyte, which is read from the state array using t, as the value of K to pass to logic gate 216. According to the present invention, the use of multiple-port memory 236 permits the read operation to obtain Sbyte to be done in parallel to the first write operation to write Sx or Sy to the state array.

If t is equal to x_cnt, then mux 246 selects the value of Sy_reg to pass to logic gate 216. If t is equal to y_reg, then mux 246 selects the value of Sx_reg to pass to logic gate 216. At substantially the same time as the value of K is being read from register 212 or 214, the state array value for the x or y location, as is applicable, is being written to memory 236. If the value of K were not read from register 212 or 214, then the two write operations to swap Sx and Sy in the state array would need to be completed prior to determining K. In contrast, according to the present invention, at least one clock cycle is saved since K is determined substantially at the same time as Sx and Sy are being swapped.

According to another aspect of the present invention, the values of y and t in the ARCFOUR algorithm are used to read values from the state array in the same clock cycle as the values are being computed. More specifically, adder 206 computes signal y_fast, which is latched in register 208 for use in later clock cycles. During the same clock cycle as y_fast is computed, however, y_fast is used to read a state array value from memory 236. Similarly, adder 210 computes signal t, which is latched in register 224. During the same clock cycle as t is computed, however, t is used to read a state array value from memory 236.

Figure 3:
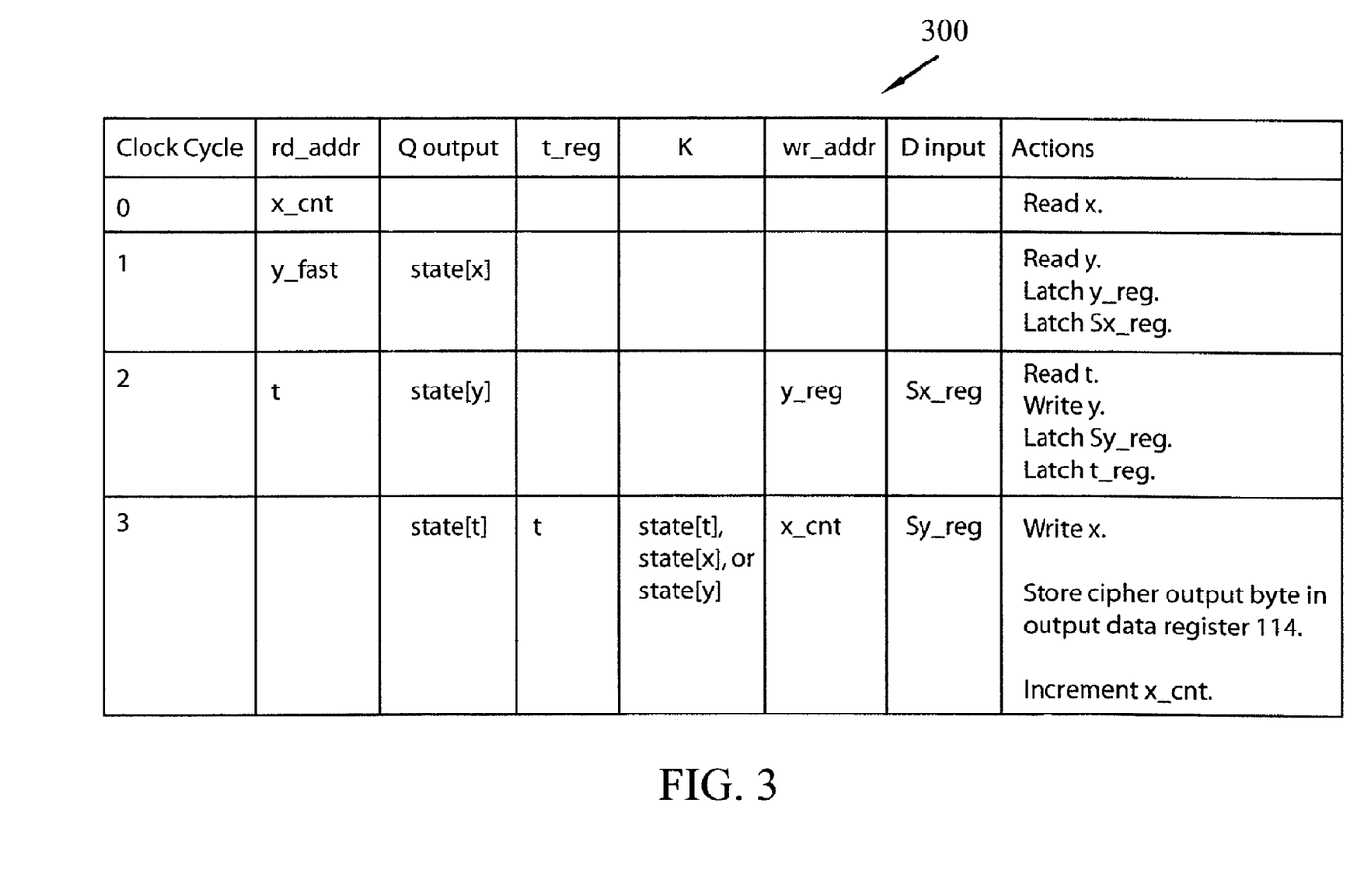
FIG. 3 is a table illustrating signal values and processing actions for a four-clock-cycle ARCFOUR implementation according to the present invention.

The present invention, as described above, permits the implementation of the standard ARCFOUR algorithm in four clock cycles. In contrast, prior implementations have typically used six clock cycles. FIG. 3 presents a table 300 illustrating signal values and processing actions for a four-clock-cycle ARCFOUR implementation according to the present invention. Specifically, in clock cycle 0, the current value of x_cnt is used to read state[x] from memory 236.

Since, in this embodiment, a sequential RAM is used, the actual value of state[x] is provided on output port Q in clock cycle 1, as illustrated in table 300.

In clock cycle 1, y_fast is computed by adder 206 and used to read state[y], which is provided on output port Q in clock cycle 2. In clock cycle 1, the value of y_fast is latched in register 208 as y_reg, and the value of state[x] read in clock cycle 0 is latched in register 214 as Sx_reg.

In clock cycle 2, t is computed by adder 210 and used to read state[t], which is provided on output port Q in clock cycle 3. In clock cycle 2, y_reg is used to write the value of Sx_reg to the state array (Sx_reg is provided to input port D). The value of state[y] is latched in register 212 as Sy_reg, and the computed value of t is latched in register 224 as t reg.

In clock cycle 3, state[t] is provided on output port Q, and K is selected by comparator system 204 as described above to have the value state[t], state[x], or state[y], by use of the corresponding value Sbyte, Sx_reg, or Sy_reg. The value x_cnt is used to write the value of Sy_reg to the state array (Sy_reg is provided to input port D). The output data byte determined from logic gate 216 is stored in output data register 114. Finally, x_cnt register 226 is incremented by one in preparation for the next iteration of the standard ARCFOUR algorithm.

Figure 4:
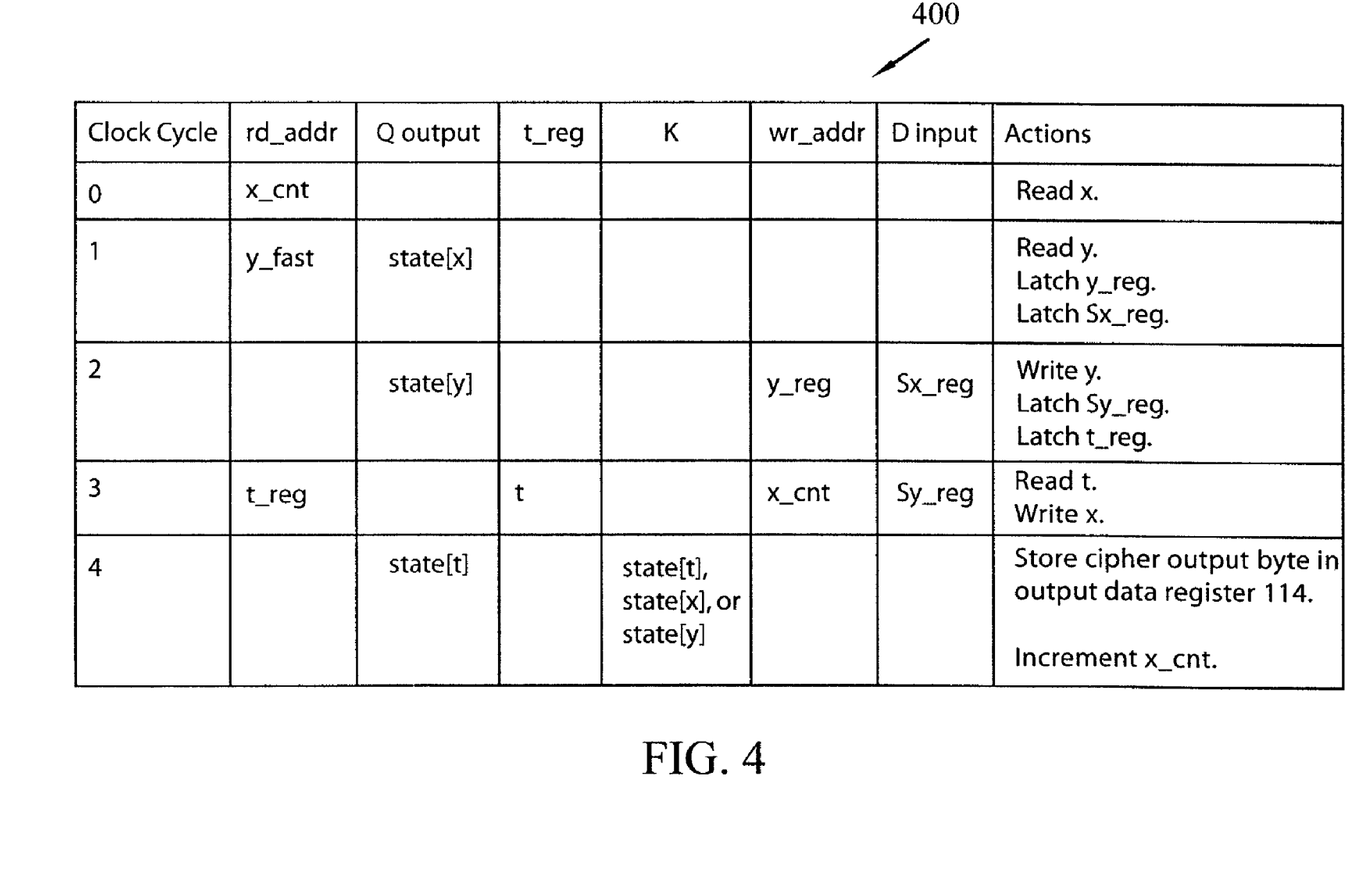
FIG. 4 is a table illustrating signal values and processing actions for a five-clock-cycle ARCFOUR implementation according to the present invention.

According to an alternative embodiment of the present invention, the ARCFOUR algorithm may be implemented in five cycles. For example, FIG. 4 presents a table 400 illustrating signal values and processing actions for a five-clock-cycle ARCFOUR implementation. This alternative embodiment and FIG. 4 are substantially identical to the embodiment and FIG. 3 described above, except that the output of t_reg register 224 is used as an input to rd_addr mux 232 instead of the value t output directly from adder 210. This requires one extra clock cycle to perform the read of t_reg from register 224. An advantage of this alternative is that the combinational circuit path from output port Q back to the rd_addr input port to memory 236 is interrupted by register 224. Thus, a shorter clock period may be used.

Figure 5:
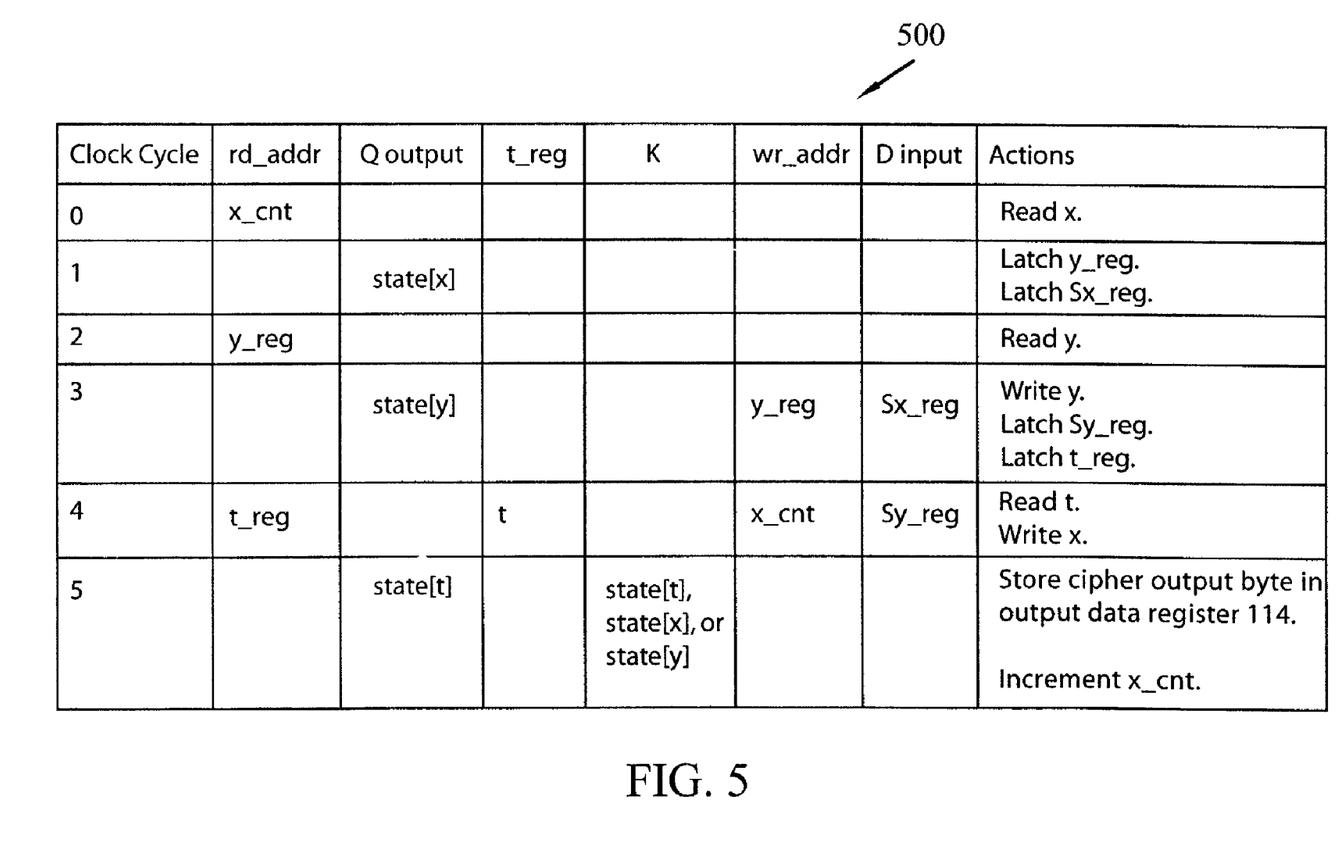
FIG. 5 is a table illustrating signal values and processing actions for a six-clock-cycle ARCFOUR implementation according to the present invention.

According to yet another alternative embodiment of the present invention, the ARCFOUR algorithm may be implemented in six cycles. For example, FIG. 5 presents a table 500 illustrating signal values and processing actions for a six-clock-cycle ARCFOUR implementation. This alternative embodiment is substantially similar to the five-clock-cycle embodiment above, except that the output of register 208 is used as the address input to mux 232 for determining read address rd_addr instead of using the value of y_fast directly from adder 206. This embodiment permits the use of the shortest clock period of the three embodiments described herein.

Initialization and Restoration of State

As mentioned above, prior to beginning cipher processing of input data, a key must be written to memory 236 and the state array initialized. Describing initialization of the state array in more detail, initially a key is written to memory 236 from, for example, external memory 108 under the control of host processor 104. Initialization FSM 230 selects, using mux 234, input addri as the write address wr_addr and selects, using mux 238, input datai as the write data to write the, for example, 256-byte key to memory 236.

Input x_cnt is selected as the write address by mux 234 and x_cnt is selected by mux 238 as the write data for port D to initially write the state array by incrementing x_cnt from 0 to 255, as called for in the ARCFOUR algorithm. Since the write data bus input to memory 236 is, for example, 8 bytes wide, 8 values can be written in one clock cycle. Thus, the value of x_cnt can be incremented by 8 for each clock cycle, which reduces the total time required to write the 256 values down to 32 clock cycles. Then, x_cnt and y_reg are reset to zero so that initialization FSM 230 may implement the standard ARCFOUR state array initialization algorithm, previously described above, using cipher engine 110.

When host processor 104 desires to handle a different packet of data to be processed using the ARCFOUR algorithm, the current state array in memory 236 is read and written to external memory 108 using input addro as read address rd_addr and datao as an output data bus.

As mentioned above, memory 236 is, for example, configured to be 8 bytes wide and 64 words deep. Because the addro/datao and addri/datai interfaces are, for example, 64-bit wide buses, host processor 104 can load and unload the state array or key in 32 clock cycles, which is eight times faster than a typical ARCFOUR hardware implementation using a byte-wide memory.

Cipher processor 102 may use a clock period of, for example, about 5 nanoseconds. However, the clock period may vary widely for specific designs and manufacturing technologies.

CONCLUSION

By the foregoing description, a novel system and method for encryption processing have been described. The present invention has the advantages of implementing the ARCFOUR algorithm, writing a key and initializing a state array, and restoring a previous state of the state array in fewer clock cycles than typical prior approaches.

Although specific embodiments have been described above, it will be appreciated that numerous modifications and substitutions of the invention may be made. For example, the present invention may be used with encryption algorithms other than the ARCFOUR algorithm in which a comparator system and/or memory system according to the present invention would be advantageous. Further, memory 236 could have more than two ports in other embodiments. Moreover, memory 236 could use word lengths other than 8 bytes. In addition, a dual-port memory with two write ports and two read ports would reduce the number of muxes required for the write and read address and data busses. Also, the method of the present invention above could be implemented on a general purpose computer executing a program having computer executable instructions stored in a computer readable medium for implementing the above method. Accordingly, the invention has been described by way of illustration rather than limitation.

What is claimed is:

1. A method for encryption processing using an encryption algorithm in an encryption processing system to provide output data, comprising:
   (a) storing a state array corresponding to the encryption algorithm wherein the state array comprises a plurality of array values each of which is indexed using one of a plurality of indexes;
   (b) reading a first array value from the state array using a first index;
   (c) reading a second array value from the state array using a second index;
   (d) reading a third array value from the state array using a third index;

(e) writing a first input array value to the state array substantially in parallel with reading the third array value;

(f) determining the output data by comparing the first index and the third index and by comparing the second index and the third index and:

(f1) if the first index and the third index are identical, using the second array value in place of the third array value to determine the output data;

(f2) if the second index and the third index are identical, using the first array value in place of the third array value to determine the output data; and (f2) if the first index and the third index are not identical, and if the second index and the third index are not identical, using the third array value to determine the output data; and (g) writing a second input array value to the state array substantially in parallel with determining the output data.

2. The method of claim 1 wherein determining the output data comprises, if the second index and the third index are not identical and if the first index and the third index are not identical, combining input data and the third array value in a logic gate to provide the output data.

3. The method of claim 2 wherein determining the output data comprises, if the first index and the third index are identical, combining input data and the second array value in a logic gate to provide the output data.

4. The method of claim 2 wherein determining the output data comprises, if the second index and the third index are identical, combining input data and the first array value in a logic gate to provide the output data.

5. The method of claim 2 wherein the logic gate provides an exclusive OR operation.

6. The method of claim 1 wherein the encryption algorithm is a stream cipher operating on one byte at a time.

7. The method of claim 6 wherein the stream cipher is the ARCFOUR or RC4 algorithm.

8. The method of claim 6 wherein:

the first index is incremented by one as each byte of output data is processed;

the third index is defined in the encryption algorithm to be dependent on the first array value and the second array value; and the second index is defined in the encryption algorithm to be dependent on the first array value.

9. The method of claim 1 wherein the state array is stored in a memory comprising a first port for reading array values from the state array and a second port for writing array values to the state array.

10. The method of claim 9 wherein the memory has a width of W bytes, where W is an integer, and is operable to load W array values into the state array, on each of a plurality of clock cycles associated with the encryption processing, using the second port.

11. The method of claim 9 further comprising:

latching the first array value into a first register;

latching the second array value into a second register; and wherein:

(1) using the first array value in place of the third array value comprises reading the first array value from the first register; and (2) using the second array value in place of the third array value comprises reading the second array value from the second register.

12. The method of claim 11 wherein:

a comparator circuit is used to perform comparing the first index and the third index and comparing the second index and the third index;

an output of the comparator circuit is coupled to a control input of a multiplexer for selecting one of first array value, third array value, or second array value to determine the output data;

an output of the multiplexer is coupled to a first input of a logic gate; and input data is provided to a second input of the logic gate.

13. The method of claim 1 further comprising calculating the second index substantially in parallel with reading the second array value.

14. The method of claim 13 wherein calculating the second index is performed using an adder having an input coupled to an output port of a memory used to store the state array and having an output coupled to an input port of the memory.

15. The method of claim 1 further comprising calculating the third index substantially in parallel with reading the third array value.

16. The method of claim 15 wherein calculating the third index is performed using an adder having:

(1) an input coupled to an output port of a memory used to store the state array; and (2) an output coupled to the input of a comparator circuit and to an input port of the memory.

17. The method of claim 1 wherein the encryption algorithm is a stream cipher that processes one byte at a time and a byte of output data is determined every four clock cycles.

18. A method for encryption processing using an encryption algorithm to provide output data, comprising:

storing a state array corresponding to the encryption algorithm wherein the state array comprises a plurality of array values each of which is indexed using one of a plurality of indexes;

reading a first array value from the state array using a first index;

calculating a second index;

reading, substantially in parallel with calculating the second index, a second array value from the state array;

reading a third array value from the state array using a third index;

writing a first input array value to the state array substantially in parallel with reading the third array value;

determining the output data by a logical operation using third array value and input data; and writing a second input array value to the state array substantially in parallel with determining the output data.

19. The method of claim 18 further comprising calculating the third index substantially in parallel with reading the third array value.

20. The method of claim 18 wherein the state array is stored in a memory comprising a first port for reading array values from the state array and a second port for writing array values to the state array.

21. The method of claim 20 wherein:

the encryption algorithm is a stream cipher that processes input data one byte at a time; and the logical operation is an exclusive OR function.

22. An apparatus for encryption processing using an encryption algorithm to provide output data, comprising:

a memory for storing a state array corresponding to the encryption algorithm wherein the state array comprises a plurality of array values each of which is indexed using one of a plurality of indexes;

a comparator circuit for comparing at least two indexes of the plurality of indexes; and a multiplexer for selecting one of the plurality of array values, responsive to the comparing of the at least two indexes, for determining the output data.

23. The apparatus of claim 22 wherein the memory comprises a first port for reading array values from the state array and a second port for writing array values to the state array.

24. The apparatus of claim 23 wherein the memory has a width of W bytes, where W is an integer, and is operable to load W array values into the state array, on each of a plurality of clock cycles associated with the encryption processing, using the second port.

25. The apparatus of claim 22 further comprising:
a logic gate having a first input for receiving input data and an output for providing the output data;
a multiplexer having an output coupled to a second input of the logic gate; and
wherein an output of the comparator circuit is coupled to a control input of the multiplexer.

26. The apparatus of claim 25 wherein:
the memory comprises a first port for reading array values from the state array and a second port for writing array values to the state array; and
the first port of the memory is coupled to a first input of the multiplexer.

27. The apparatus of claim 26 further comprising:
an output data register coupled to the output of the logic gate;
an input data register coupled to the first input of the logic gate for providing the input data;
a host processor coupled to the output data register and the input data register; and
an external memory coupled to the memory for saving a current state of the state array for later use in resuming an encryption session corresponding to the saved current state.

28. The apparatus of claim 26 further comprising:
a first register for latching a first array value corresponding to a first index;
a second register for latching a second array value corresponding to a second index; and wherein:
(1) an output of the first register is coupled to a second input of the multiplexer; and
(2) an output of the second register is coupled to a third input of the multiplexer.

29. The apparatus of claim 28 wherein comparing the at least two indexes comprises:
comparing the first index and a third index corresponding to a third array value; and
comparing the second index and the third index.

30. The apparatus of claim 29 further comprising:
a first adder for calculating the second index;
a second adder for calculating the third index; and wherein:
(1) an output of the first adder is coupled to an address port of the memory for writing array values to the memory;
(2) an output of the second adder is coupled to a first input of the comparator circuit;
(3) the first index is provided to a second input of the comparator circuit; and
(4) the second index is provided to a third input of the comparator circuit.

31. A method for encryption processing using an encryption algorithm to provide output data, comprising:
storing a state array, corresponding to the encryption algorithm, in a memory wherein the state array comprises a plurality of array values each of which is indexed using one of a plurality of indexes;
comparing at least two indexes of the plurality of indexes using a comparator circuit; and
selecting one of the plurality of array values, using a multiplexer having a control input coupled to an output of the comparator circuit and a data input coupled to the memory and the selecting being responsive to the comparing of the at least two indexes, for determining the output data.

* * * * *